C. E. JOHNSON.
BATTERY GRIP.
APPLICATION FILED JUNE 1, 1921.
1,422,765.
Patented July 11, 1922.
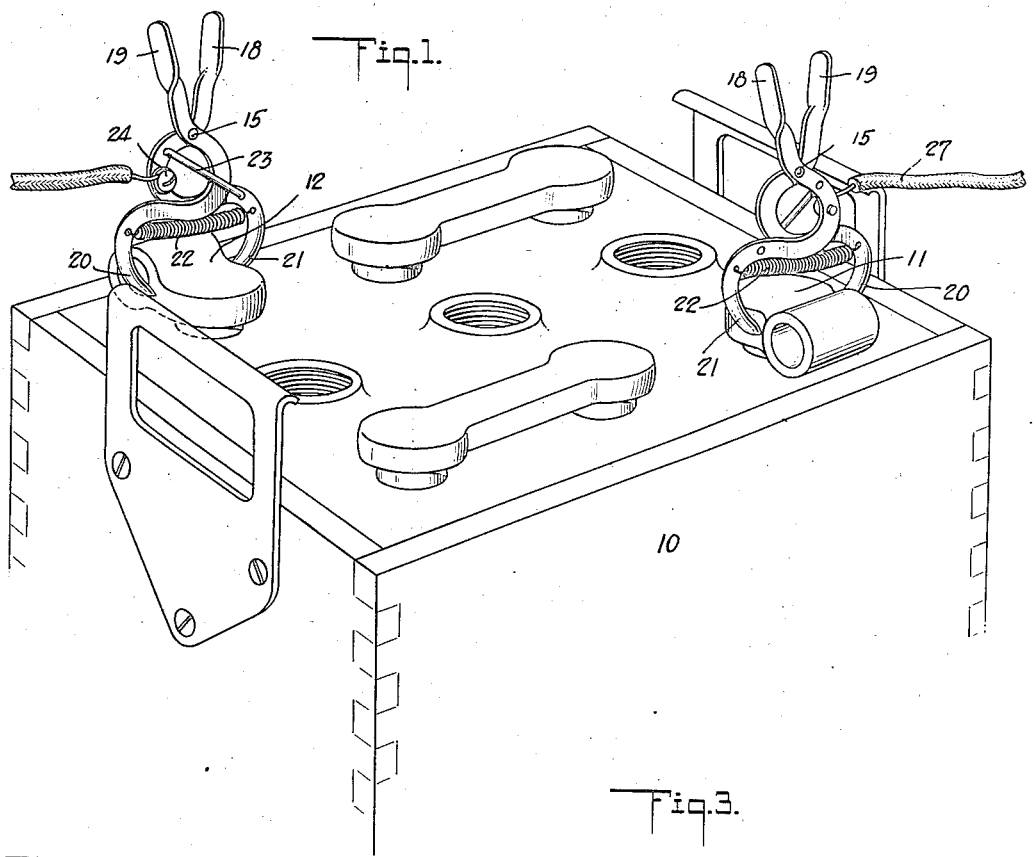
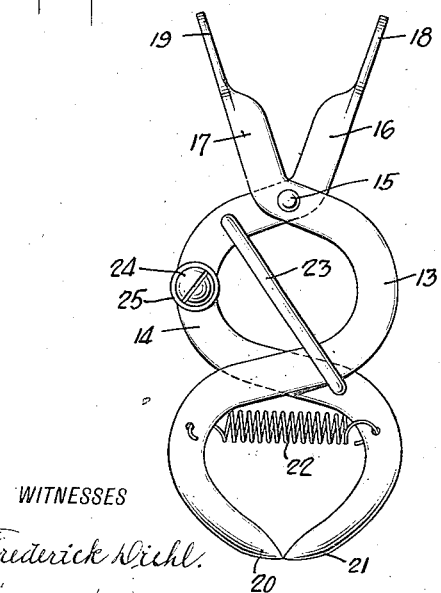
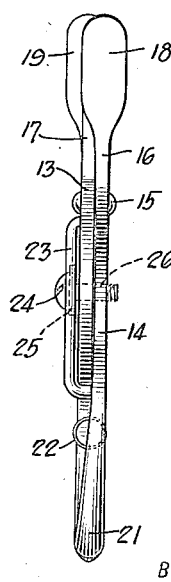
WITNESSES
INVENTOR
CARL E. JOHNSON
BY
ATTORNEYS

UNITED STATES PATENT OFFICE.

CARL EBEN JOHNSON, OF CHANUTE, KANSAS.

BATTERY GRIP.

1,422,765.

Specification of Letters Patent.   Patented July 11, 1922.

Application filed June 1, 1921. Serial No. 474,240.

*To all whom it may concern:*

Be it known that I, CARL EBEN JOHNSON, a citizen of the United States, and a resident of Chanute, in the county of Neosho and State of Kansas, have invented a new and Improved Battery Grip, of which the following is a full, clear, and exact description.

This invention relates to battery grips for connecting lead wires to the battery terminals.

The usual method employed is to have a small, threaded bolt connected with the terminal, and co-operating with the threaded bolt a nut, which is used to clamp the wire against the terminal. This method is unsatisfactory owing to the fact that the nut continually works loose and allows a loose connection. It is also too slow a method of connecting the lead wires for various purposes such as testing.

The object of this invention is to provide a simple and durable battery grip that may be quickly operated to connect the lead wires to the terminal of an electric battery and which gives a satisfactory connection.

This and other objects will be more clearly understood from the foregoing detailed description and accompanying drawings.

Figure 1 is a view of the battery grip showing it connected to the terminal of a battery;

Figure 2 is a plan view of the battery grip; and

Figure 3 is a side elevation of the battery grip as shown in Figure 2.

Referring to the above-mentioned figures, a battery 10 having terminals 11 and 12 has a battery grip connected to each terminal. This battery grip consists of two S-shaped jaw members 13 and 14, crossing near their centers and pivoted together as at 15. Integral with each S-shaped jaw member and extending above the pivot point 15 are handles 16 and 17. The upper ends of these handles 16 and 17 are turned at right angles to the lower portions to form finger grips 18 and 19. The lower ends 20 and 21 of the S-shaped jaw members 13 and 14 are flattened to extend at right angles to the main jaw portion. These ends 20 and 21 are also bent towards one another so that they abut when the grip is in its closed position. A spring 22 is provided to connect the jaw members 13 and 14 near their lower ends. This spring 22 tends to hold the ends 20 and 21 in contact or to draw them together when they are separated. Mounted on either of the jaw members is a guide 23 which may serve to limit the movement of the other jaw member and to guide the movements of the jaw members so that the ends 20 and 21 come together when the grip is closed. In this case the guide 23, as shown in Figure 2, is mounted on the jaw member 14. A screw 24, which carries a washer 25 engages in a threaded opening 26 in jaw member 14 and serves to attach the lead wires 27 to the battery grip. This screw might be mounted in jaw 13.

The lead wires remain attached to the grip and when it is desired to attach the grip to a battery terminal the finger grips 18 and 19 are pressed together thus opening the jaws 13 and 14, which are slipped over the battery terminal. The finger grips are then released and the ends 20 and 21 are brought into contact with the battery terminal by the spring 22. It will be seen that this gives a tight contact that will not loosen and that may be quickly removed.

Claim:

A battery grip, comprising S-shaped jaw members pivoted near their upper ends, handles integral with the jaw members and extending above the pivot point, flattened sharpened ends formed on the lower extremities of the jaw members in alinement with one another so that they abut, a spring connected to the jaw members and extending between them to normally retain the ends of the jaw members in engagement with one another, screw attaching means mounted on one of the jaw members, and a guide for controlling the movements of the jaw members associated with them.

CARL EBEN JOHNSON.